March 20, 1951 A. C. BALSON 2,545,722
TIRE CHAIN APPLYING DEVICE
Filed Aug. 1, 1947 3 Sheets-Sheet 1
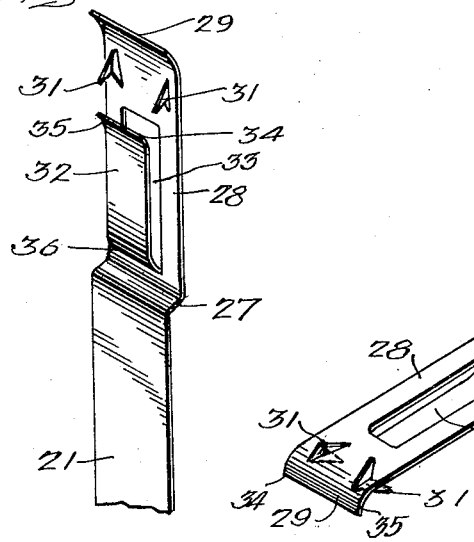
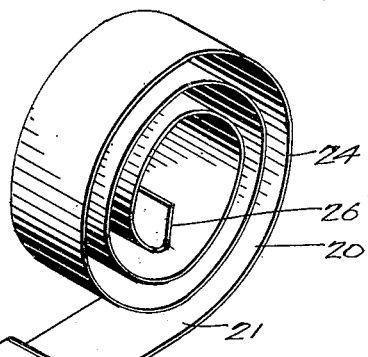
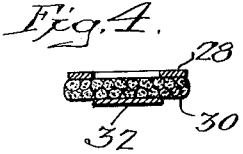
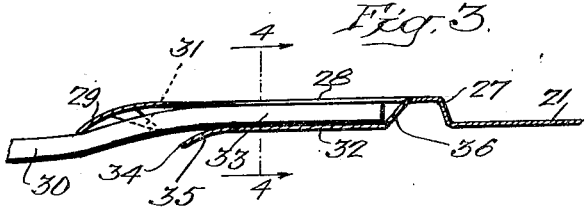
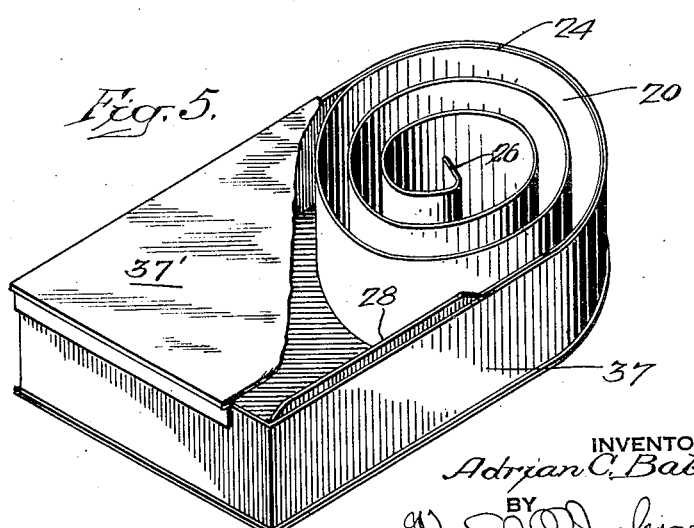
INVENTOR
Adrian C. Balson
BY
ATTORNEYS.

March 20, 1951     A. C. BALSON     2,545,722
TIRE CHAIN APPLYING DEVICE

Filed Aug. 1, 1947     3 Sheets-Sheet 2

INVENTOR
Adrian C. Balson
BY
ATTORNEYS

March 20, 1951 A. C. BALSON 2,545,722
TIRE CHAIN APPLYING DEVICE

Filed Aug. 1, 1947 3 Sheets-Sheet 3

INVENTOR
Adrian C. Balson
BY
ATTORNEYS.

Patented Mar. 20, 1951

2,545,722

UNITED STATES PATENT OFFICE 2,545,722

TIRE CHAIN APPLYING DEVICE

Adrian C. Balson, Philadelphia, Pa.; John A. Balson administrator of said Adrian C. Balson, deceased Application August 1, 1947, Serial No. 765,286

1 Claim. (Cl. 81—15.8)

My invention relates to hand tools for inserting or threading the fabric or suitable straps of individual automobile cross chain assemblies through the slots of automobile wheels and around the tires.

A purpose of my invention is to simplify and cheapen the construction of automobile tire chain strap threaders.

A further purpose is to avoid the necessity of puncturing the strap with holes clear through for engagement of a buckler or the like, and to prevent the operator from wasting time and encountering trouble in manipulating buckles and clamps provided with lever devices, especially when such operations are troublesome due to the necessity of wearing gloves.

A further purpose is to enable the operator to attach the end of the tire chain unit strap into the threading tool by simply inserting the end in a socket and engaging the side against prongs at the mouth of the socket.

A further purpose is to permit the engaging end of a tire chain strap threader to be formed entirely by stamping from the strip making up the threader.

Further purposes appear in the specification and in the claim.

In the drawings I have chosen to illustrate one only of the various embodiments of which my invention may appear choosing the form shown from the standpoints of convenience in operation, satisfactory illustration and clear demonstration of the principles involved.

Figure 1 is a perspective of my tire chain threader in inactive position.

Figure 2 is a perspective of the strap gripping end.

Figure 3 is a central longitudinal section of the gripping end with a strap in gripping position.

Figure 4 is a section of Figure 3 on the line 4—4.

Figure 5 is a fragmentary perspective of my threader in inactive position and lying within a container.

Figure 6:
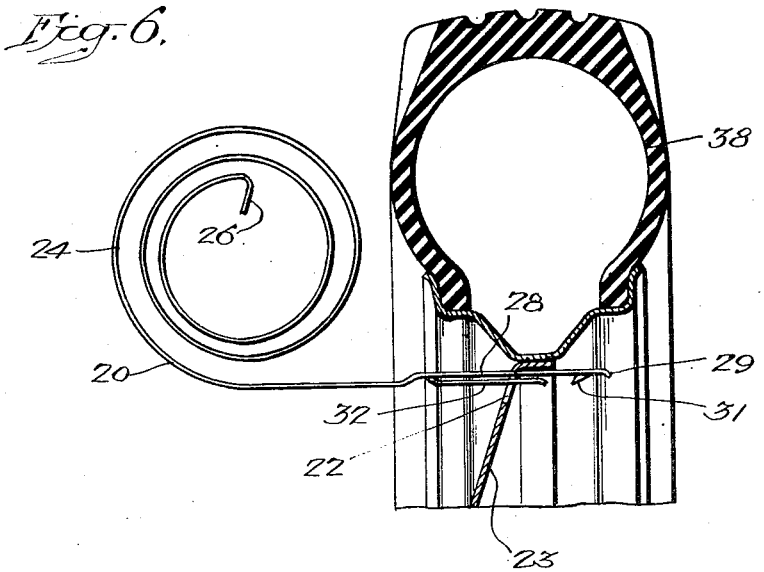

Figures 6 to 9, inclusive, are radial sections of a tire and wheel showing the progressive steps in use of the threader to apply an individual tire chain unit to the tire. In these views the tube of the pneumatic tire is omitted.

Describing in illustration, but not in limitation, and referring to the drawings:

During recent years, the cumbersome characteristic of automobile tire chains completely enveloping the wheel, and the expense thereof have led to the adoption of individual tire chain units consisting of a cross chain or group of cross chains held in place by a strap which passes through a slot or between the spokes in the automobile wheel. These individual tire chain units are capable of application without moving or jacking up the car, and therefore are most convenient in application when inclement weather overtakes the driver on the road.

One serious difficulty, however, in the application of individual tire chain units is that it has been necessary in many cases to reach around behind the tire to thread the strap to and through the slot in the wheel. To overcome this difficulty threaders have developed which usually involve buckles or lever clamping jaws for engagement with the end of the strap. Not only are such gripping means inconvenient to use, especially when the operator is wearing gloves and is impatient because of the cold, but also such prior art mechanisms frequently involve considerable expense in production, and entail the use of projecting parts which are likely to catch during the employment of the tool.

In accordance with the present invention the strap can be engaged in the threader simply by sticking the end in a recess between a tongue and a body, and straightening the strap out so that it is pushed against prongs on the body. No drilling of buckle holes in the strap is necessary, and no manipulations of buckles or clamping levers is necessary.

The device involves very little projection of the walls of the gripper beyond the sides of the strap, so that there is little danger of fouling on the parts of the wheel or tire.

The whole gripper can be made by stamping from the strip forming the threader, and thus expense of materials and fabrication are much reduced.

My threader 20 is formed from a strip 21 of resilient material of a width and thickness suitable to pass readily through the strap slot 22 of an automobile wheel 23. The preferred material will be spring steel strip, of either plain carbon or alloy steel grade, but it will be understood also that resilient steel strip not of spring grade may be employed provided it has sufficient "spring" to maintain a tendency to curl as shown at 24, and to hug the tire as shown at 25. The device will conveniently achieve an Archimedes spiral in inactive position, as shown.

In case it be desired to manufacture the device from non-ferrous materials, it may be manufactured from brass, bronze or beryllium copper of suitable spring temper.

The rear end of the strip, which will function as a handle, is conveniently bent transversely at 26 for convenient gripping.

The grip end for engaging the strap is formed from the strip material, preferably first bending laterally at 27 to displace the strap end slightly toward the inside of the curve of the strip, and then continuing the body portion 28 of the gripper in prolongation of the strip substantially straight until the end, at which a curve 29 is provided to one side, suitably to the outside of the curve of the strip. This curvature serves to mark the gripping prongs, and assures close engagement with the strap 30, so that no projection from the threader likely to catch on the walls of the slot or parts of the tire is presented at the front of the threader.

Suitably inside the concavity of the curve 29 of the body, close to the end of the body and preferably punching therefrom, I provide gripping prongs 31 pointing away from the end and capable of embedding themselves in the strap as shown best in Figure 3.

Punched from the strap, displayed and parallel to the body I provide a resilient tongue 32 forming a recess or socket 33 for the end of the strap and terminating at 34 short of the prongs in a curve 35 away from the body, which serves to guide the end of the strap into the recess 33. The tongue by its spring action tends to hold its position and to press the strap in position to engage and be held by the prongs 31.

It will thus be seen that upon insertion of the end of the strap in the recess and straightening out of the strap in prolongation of the strip, the gripping action of the strip is automatic in tension, and some gripping action in compression is provided by pushing against the base 26 of the recess.

When in an inactive position the threader by virtue of its spring character curls up to the shape shown in Figure 5, and conveniently fits within a box or can 37 having a lid 37' and capable of fitting into the tool compartment of an automobile.

Figure 7:
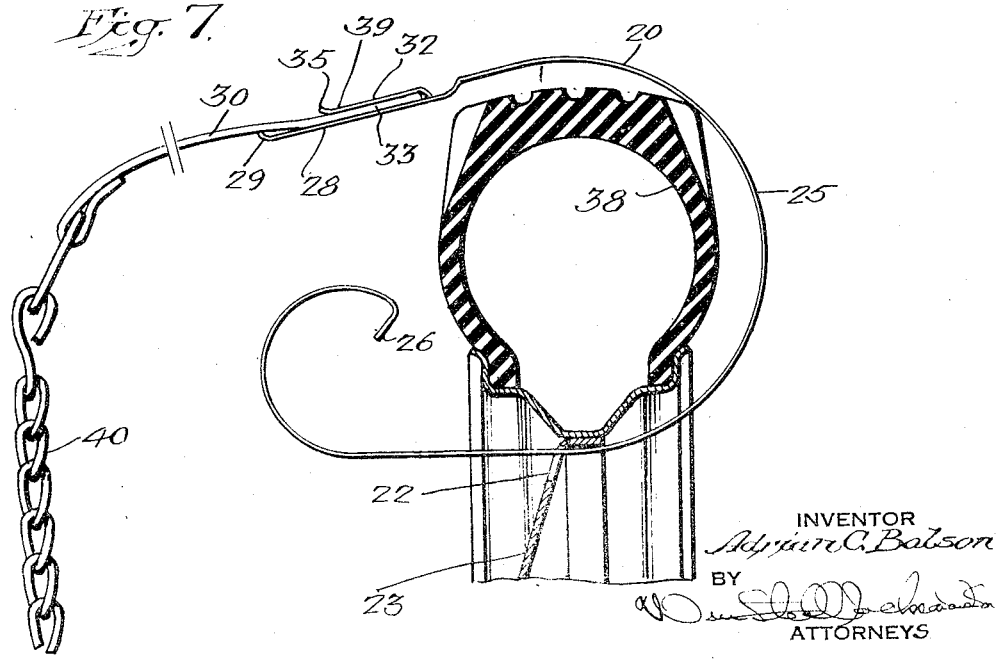

In operation the threader is inserted through the solt 22, gripping end foremost, as shown in Figure 6 and pushed forward, hugging the tire 38 as shown in Figure 7. The gripping end then protrudes on the outside beyond the tire as shown at 39, and the strap 30 of the individual tire chain unit 40 is inserted end first into the recess 33 and engaged with the prongs 31 to hold the strap in place. The engagement between the prongs and the strap is maintained partly by the hooked character of the prongs and partly by the spring pressure of the tongue 32.

Figure 8:
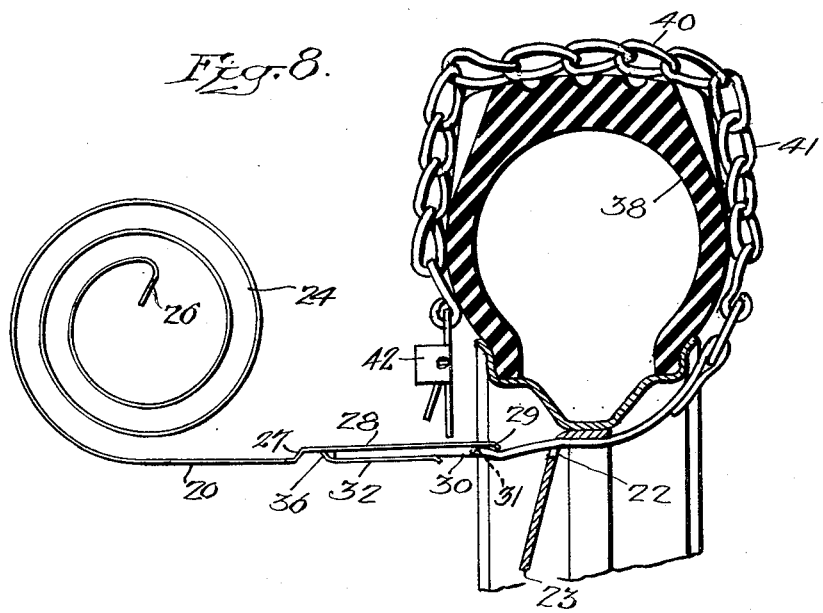
Figure 9:
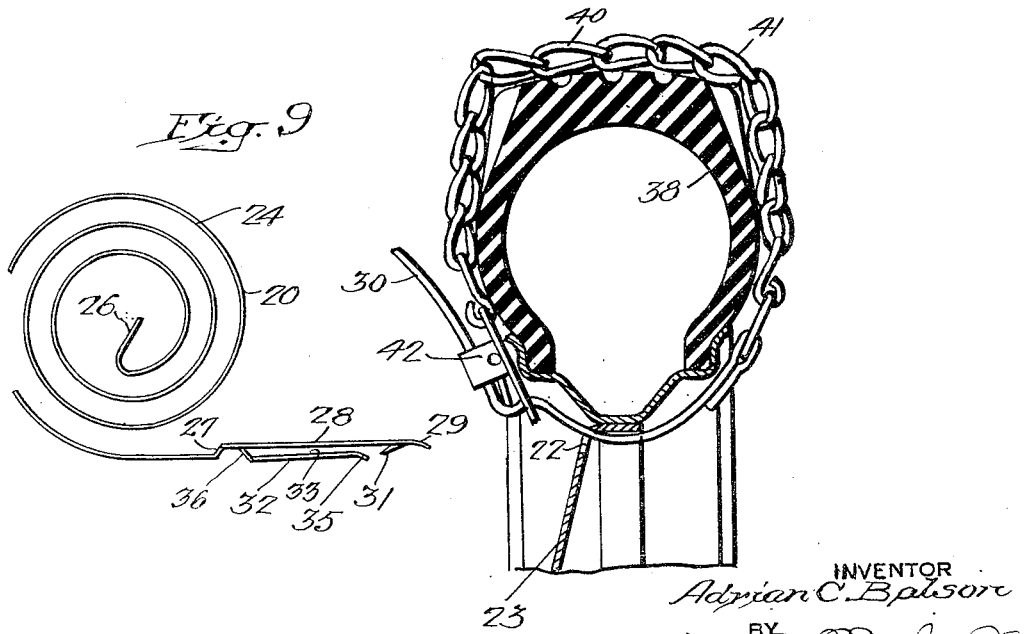

The next step, shown in Figure 8, is to pull on the threader drawing the cross chain portion 41 around and over the tire 38 until the strap 30 emerges from the slot 22 as shown in Figure 8. The threader has now performed its function and can be removed as shown in Figure 9 while the clamp or buckle 42 of the individual tire chain unit is fastened to the strap 30.

In view of my invention and disclosure variations and modifications to meet individual whim or particular need will doubtless become evident to obtain all or part of the benefits of my invention without copying the structure shown, and I, therefore, call all such insofar as they fall within the reasonable spirit and scope of my claim.

Having thus described my invention what I claim as new and desire to secure by Letters Patent is:

In a hand threader for introducing the strap of an individual tire chain through the slot in a wheel and around a tire, a resilient metallic strip curved and adapted to hug the curve of a tire and a gripper formed from the strip at the end thereof and comprising a body extending in prolongation of the threader and curved transversely at the end, prongs extending from the body in the concavity of the curve and directed away from the end and walls forming a socket for the end of a strap located on one side of the body and remote from the end of the body, the wall of the opening end of the socket being flared outwardly to facilitate the insertion of the strap into the socket at a position beyond the ends of the prongs.

ADRIAN C. BALSON.

REFERENCES CITED

The following references are of record in the file of this patent:

UNITED STATES PATENTS

| Number | Name | Date |
| --- | --- | --- |
| 1,653,465 | Montan et al. | Dec. 20, 1927 |
| 2,257,657 | Spahr | Sept. 30, 1941 |
| 2,293,650 | Hudson | Aug. 18, 1942 |
| 2,328,680 | Royer | Sept. 7, 1943 |